(12) United States Patent
Despesse et al.

(10) Patent No.: US 11,509,147 B2
(45) Date of Patent: Nov. 22, 2022

(54) METHOD AND APPARATUS FOR CONTROLLING A BATTERY PACK

(71) Applicant: Commissariat à l'Énergie Atomique et aux Énergies Alternatives, Paris (FR)

(72) Inventors: Ghislain Despesse, Voreppe (FR); Eric Fernandez, Saint Paul de Varces (FR); Sylvain Bacquet, Chasselay (FR); Léandro Cassarino, Talence (FR); Yan Lopez, Renage (FR); Rémy Thomas, Echirolles (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 286 days.

(21) Appl. No.: 16/958,610

(22) PCT Filed: Dec. 24, 2018

(86) PCT No.: PCT/FR2018/053545
§ 371 (c)(1),
(2) Date: Jun. 26, 2020

(87) PCT Pub. No.: WO2019/129993
PCT Pub. Date: Jul. 4, 2019

(65) Prior Publication Data
US 2020/0335986 A1  Oct. 22, 2020

(30) Foreign Application Priority Data

Dec. 27, 2017 (FR) .................................. 1763251

(51) Int. Cl.
*H01M 10/44* (2006.01)
*H01M 10/46* (2006.01)
(Continued)

(52) U.S. Cl.
CPC ......... *H02J 7/0024* (2013.01); *H01M 10/425* (2013.01); *H02J 7/0025* (2020.01);
(Continued)

(58) Field of Classification Search
CPC ...... H02J 7/0024; H02J 7/0047; H02J 7/0025; H02J 7/00032; H02J 7/00034;
(Continued)

(56) References Cited

U.S. PATENT DOCUMENTS

2013/0320772 A1  12/2013  Qiao et al.
2015/0207355 A1   7/2015  Taylor et al.
(Continued)

FOREIGN PATENT DOCUMENTS

EP          3657815 A1 *  5/2020  ........ H01M 10/4207
WO    WO 2016/170314 A1  10/2016
WO    WO-2022019481 A1 *  1/2022  ........ H01M 10/4207

OTHER PUBLICATIONS

International Preliminary Report on Patentability for International Application No. PCT/FR2018/053545, dated Jul. 9, 2020.
(Continued)

*Primary Examiner* — Edward Tso
(74) *Attorney, Agent, or Firm* — Wolf, Greenfield & Sacks, P.C.

(57) ABSTRACT

A method of controlling a battery including a first control circuit and a plurality of modules arranged in series between first and second terminals, each module including electric cells and switches and a second switch control circuit, the battery further including at least one first data transmission bus coupling the first control circuit to each second control circuit, the method including the transmission, by the first control circuit to the second control circuits, of first data representative of an electric cell configuration to be obtained to follow a set point for the delivery of a voltage and/or of
(Continued)

a current between the first and second terminals, the second control circuits connecting or disconnecting the electric cells based on said first data and on a classification of the priorities of the electric cells.

11 Claims, 3 Drawing Sheets

(51) Int. Cl.
*H02J 7/00* (2006.01)
*H01M 10/42* (2006.01)
*H04L 12/40* (2006.01)
*H04Q 9/00* (2006.01)

(52) U.S. Cl.
CPC ............... *H04L 12/40* (2013.01); *H04Q 9/00* (2013.01); *H01M 2010/4271* (2013.01); *H04L 2012/40208* (2013.01)

(58) Field of Classification Search
CPC ........... H04L 12/40; H04L 2012/40215; H04L 2012/40208; H04Q 9/00; H04Q 2209/30; H01M 10/425; H01M 2010/4271
USPC ......... 320/107, 110, 116, 117, 118, 132, 148
See application file for complete search history.

(56) References Cited

U.S. PATENT DOCUMENTS

2020/0335831 A1\* 10/2020 Lee .................... H01M 10/482
2020/0365949 A1\* 11/2020 Fernandez ............ H02J 7/0024

OTHER PUBLICATIONS

International Search Report and Written Opinion for International Application No. PCT/FR2018/053545, dated Mar. 4, 2019.

\* cited by examiner

METHOD AND APPARATUS FOR CONTROLLING A BATTERY PACK

This application is a national stage filing under 35 U.S.C. § 371 of International Patent Application Serial No. PCT/FR2018/053545, filed Dec. 24, 2018, which claims priority to French patent application FR17/63251, filed Dec. 27, 2017. The contents of these applications are incorporated herein by reference in their entireties.

BACKGROUND

The present invention concerns a battery of electric cells or accumulators, also called pack battery.

DISCUSSION OF THE RELATED ART

It is known to form a battery comprising a plurality of stages or modules, in each of which accumulators, also called cells, may be connected in series or in parallel by controllable switches. Such a battery is capable of delivering a voltage having a waveform capable of varying over time by varying the connection of the cells over time via the turning on or the turning off of the switches.

FIG. 1 shows an example of such a battery 5. Battery 5 comprises N modules $E_1$ to $E_N$. Number N is an integer that may be in the range from 1 to 50. Each module comprises a positive terminal B+ and a negative terminal B− and a plurality of cells, not shown, capable of being connected to one another in series and/or in parallel via switches, not shown, between terminals B+ and B−. Modules $E_1$ to $E_N$ may be series-connected between a first terminal Neutral of battery 5 and a second terminal Phase of battery 5. An example of such a battery is described in patent application WO 2012/117110.

Battery 5 comprises a circuit BMS for controlling modules $E_1$ to $E_N$, called master control circuit hereafter. Master control circuit BMS may exchange data with each module $E_1$ to $E_N$ via a bidirectional data transmission BUS. Each module $E_1$ to $E_N$ comprises a circuit, not shown, for controlling switches of the module, called slave control circuit hereafter, based on the control signals supplied by master control circuit BMS. Each module further comprises sensors, not shown, for example, sensors of the voltage across each cell of the module, sensors of the current delivered by each cell of the module, and/or sensors of the temperature of each cell of the module. The slave control circuit of each module $E_1$ to $E_N$ is capable of transmitting to master control circuit BMS data representative of the voltage, current, and/or temperature measurements over data transmission bus BUS.

Master control circuit BMS may receive a set point C, for example, a voltage or current set point, transmit first data, for example, the total number of cells to be connected, to the modules via data transmission bus BUS from which the slave control circuit of each module connects or disconnects its cells to obtain the voltage and/or the current desired between terminals Phase and Neutral of battery 5.

It is desirable to perform the selection of the cells to be connected/disconnected by ensuring that each cell operates in its optimal operating range according to the voltage, current, and temperature measurements supplied by the modules. In particular, it is desirable to perform a balancing of the cells, that is, for the cell selection to be performed so that the differences between the states of charge of the cells are permanently as small as possible. It is further desirable for the cell selection to take into account a possible failure of a cell so as to, for example, exclude this cell from the selection.

To perform the balancing function, master control circuit BMS may determine a classification of the cells according to priority levels, the cells holding the highest priority in the classification being those which should be selected first. The priority classification, also called priority table, is capable of varying during the battery operation, particularly due to the variation of the states of charge of the cells or due to the failure of a cell.

The priority table may be stored at the level of each module and the slave control circuit of each module determines, based on the total number of cells to be connected and on the priority table, the cells of the module to be connected/disconnected. When the priority table is modified, the master control circuit may transmit to the slave control circuits second data representative of the update of the priority table.

For certain applications, the set point received by management circuit BMS may vary rapidly so that it may be difficult to ensure that master control circuit BMS properly transmits the first data for to follow the set point and the second data relative to the updates of the priority table.

SUMMARY

Thus, an object of an embodiment is to provide a battery which overcomes at least some of the disadvantages of the previously-described batteries.

Another object of an embodiment is for the transmission of the data from the master control circuit to the slave control circuits of the modules relative to the following of the set point not to be disturbed by the modification of the priority classification.

Thus, an embodiment provides a method of controlling a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells to one another and to the third and fourth terminals of the module and a second switch control circuit, the battery further comprising at least one first data transmission bus coupling the first control circuit to each second control circuit, the method comprising the transmission, by the first control circuit to the second control circuits, of first data representative of an electric cell configuration to be obtained to follow a set point for the delivery of a voltage and/or of a current between the first and second terminals, the second control circuits connecting or disconnecting the electric cells based on said first data and on a classification of the priorities of the electric cells. The method further comprises the steps of:

a) determination by the first control circuit of a new version of the priority classification;
b) transmission, by the first control circuit to each second control circuit, of second data representative of at least a portion of the new version of the priority classification;
c) transmission, by each second control circuit to the first control circuit, of third data indicating the reception by the second control circuit of said at least a portion of the new version of the priority classification; and d) transmission, by the first control circuit to the second control circuits, of an order to use the new version of the priority classification.

According to an embodiment, the battery further comprises a second data transmission bus coupling the first control circuit to each second control circuit. The first control circuit transmits the first data to the second control circuits over the first bus and transmits the second data to the second control circuits over the second bus.

According to an embodiment, the second control circuits transmit the third data to the first control circuit over the second bus.

According to an embodiment, the first control circuit transmits the order to use the new version of the priority classification to the second control circuits over the first bus.

According to an embodiment, the first control circuit transmits the first data to the second control circuits over the first bus at a first rate and transmits the second data to the second control circuits over the second bus at a second rate smaller than the first rate.

According to an embodiment, the first data are representative of the number of cells to be series-connected to follow the set point.

According to an embodiment, the second data are representative of the entire priority classification.

According to an embodiment, the second data are representative of the portion of the classification of the priorities of the electric cells of one of the modules.

An embodiment also provides a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells to one another and to the third and fourth terminals of the module and a second switch control circuit, the battery further comprising a first data transmission bus coupling the first control circuit to each second control circuit and a second data transmission bus coupling the first control circuit to each second control circuit. The first control circuit is configured to transmit, to the second control circuits, first data representative of an electric cell configuration to be obtained to follow a set point for the delivery of a voltage and/or of a current between the first and second terminals, the second control circuits being configured to connect or disconnect the electric cells based on said first data and on an electric cell priority classification. The first control circuit is configured to determine a new version of the priority classification and to transmit to each second control circuit second data representative of at least a portion of the new version of the priority classification. Each second control circuit is configured to transmit to the first control circuit third data indicating the reception by the second control circuit of said at least a portion of the new version of the priority classification. The first control circuit is configured to transmit to the second control circuits an order to use the new version of the priority classification.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. For the sake of clarity, only the elements that are useful for an understanding of the embodiments described herein have been illustrated and described in detail. In particular, the conventional functions carried out by the master and slave control circuits of a cell battery, such as the cell balancing, are well known by those skilled in the art and are not described in further detail hereafter. In the following description, the expressions "substantially", "about", "approximately", and "in the order of" mean "within 10%", preferably within 5%.

An embodiment of a method of controlling systems with switched cells will be described in the case of a switched cell battery for which the cells correspond to switched cells. However, the present embodiments apply to any type of system with switched cells capable of supplying a variable voltage to a load. Each cell of the system with switched cells may correspond to an electric charge storage element or to an electric generator. An example of an electric charge storage element for example is an electric cell or a capacitor. An example of an electric generator is for example a fuel cell, a zinc-air cell, a photovoltaic cell, or a power recovery system, particularly a small wind power plant or a mini-turbine. The system which switched cells may comprise electric charge storage elements only, electric generators only, or both electric charge storage elements and electric generators. When the system with switched cells comprises electric generators only, the use is theoretically in discharge mode only. However, in case of a reactive power, for brief passages through a negative power at each period, the inertia of the generator may be sufficient to smooth the power, for example, due to the rotation inertia and to the stray capacitances. Further, each generator may be connected in parallel to a resistive element, to accept negative powers, by dissipating this power. In operation, the system is intended to be coupled to a device which absorbs or supplies power according to the envisaged application. As an example, this device corresponds to an electric machine, for example, to an electric motor, or to the electric distribution network.

Figure 1:
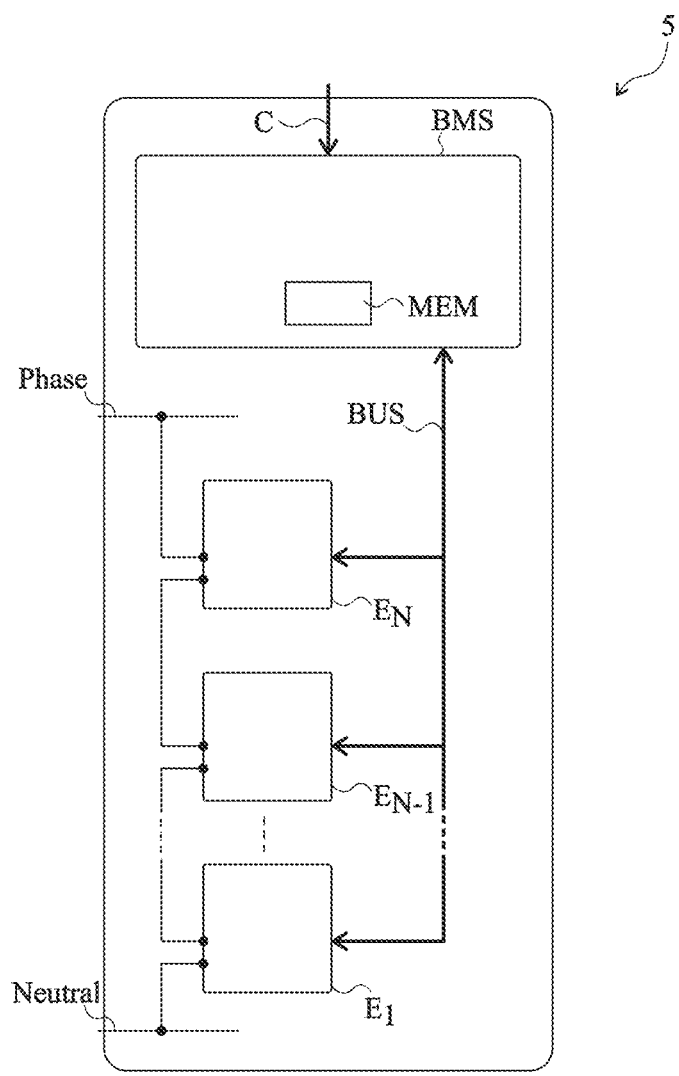
FIG. 1, previously described, partially and schematically shows an example of a cell battery.
Figure 2:
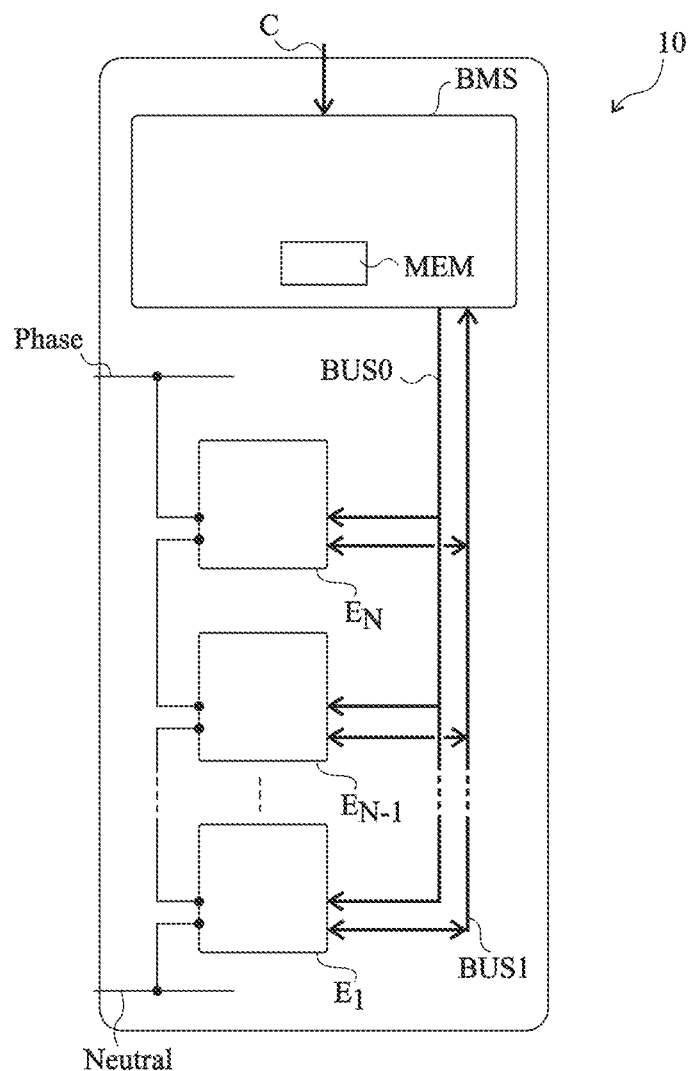
FIG. 2 partially and schematically shows an embodiment of a cell battery.

FIG. 2 shows an embodiment of a battery 10. Battery 10 comprises all the elements of the battery 5 shown in FIG. 1, with the difference that bus BUS is replaced with two buses BUS0 and BUS1, which each couple master control circuit BMS to each module $E_1$ to $E_N$.

Bus BUS0 is a fast bus, that is, a bus over which the data are transmitted at a rate greater than 3 megabits per second, preferably in the range from 5 megabits per second to 7 megabits per second. Bus BUS0 may be a unidirectional bus. As an example, bus BUS0 is a bus according to the RS485 standard.

Bus BUS1 is a slow bus, that is, a bus over which the data are transmitted at a rate smaller than 3 megabits per second, preferably in the range from 0.5 megabit per second to 1 megabit per second. Bus BUS1 is a bidirectional bus. As an example, bus BUS1 is a CAN data bus, particularly according to ISO standard 11898.

Fast bus BUS0 is used for the transmission of the first data supplied by master control circuit BMS to follow set point C. According to another embodiment, the first data correspond to a number of cells to be connected to follow set point C.

Slow bus BUS1 is used for the exchange of all the other data between master control circuit BMS and each module $E_1$ to $E_N$. In particular, slow bus BUS1 is used for the transmission of the second data relative of the updates of the priority table.

Master control circuit BMS may correspond to a dedicated circuit and/or may comprise a processor, for example, a microprocessor or a microcontroller, capable of executing instructions of a computer program stored in the memory. Master control circuit BMS particularly comprises a data storage memory MEM.

Figure 3:
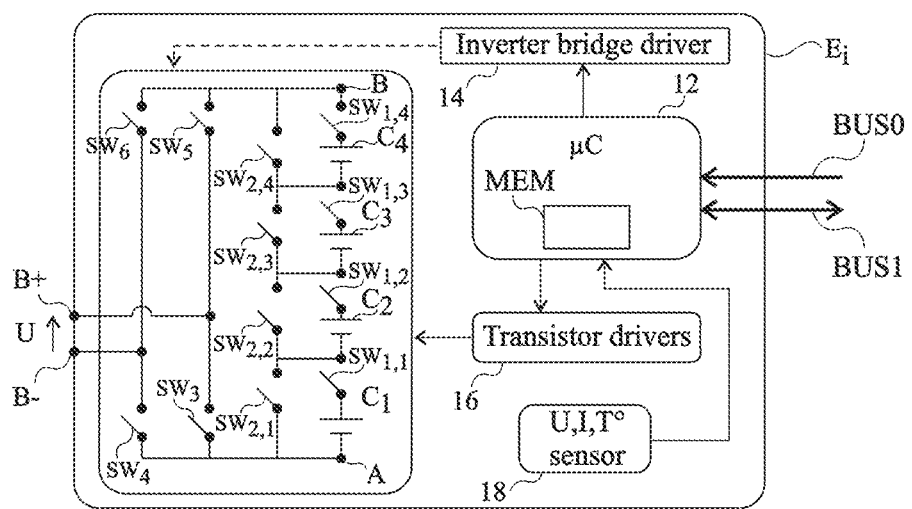
FIG. 3 partially and schematically shows an example of a module of the battery of FIG. 1 or 2.

FIG. 3 shows an embodiment of module $E_i$, where i varies from 1 to N, each module $E_1$ to $E_N$ may have a similar structure.

According to the present embodiment, module $E_i$ is capable of delivering a voltage U between positive terminal B+ and negative terminal B−. Module $E_i$ comprises cells $C_1$ to $C_M$, where M is an integer in the range from 2 to 10, preferably from 2 to 5, four cells $C_1$, $C_2$, $C_3$, and $C_4$ being shown as an example in FIG. 3. Cells $C_1$ to $C_M$ are coupled together and to terminals B+ and B− by switches. In the present embodiment, for each cell $C_k$, k being an integer varying from 1 to M, module $E_i$ comprises a first switch $SW_{1,k}$ in series with cell $C_k$ and a second switch $SW_{2,k}$ in parallel with the assembly comprising cell $C_k$ and switch $SW_{Lk}$. The M assemblies comprising cell $C_k$ and first switch $SW_{Lk}$ are arranged in series between a node A and a node B. The control of switches $SW_{1,k}$ and $SW_{2,k}$, with k varying from 1 to M, enables to place in series between nodes A and B from 1 to M cells among the M cells $C_1$ to $C_M$. In the present embodiment, module $E_i$ further comprises an inverter bridge, also called H bridge, between nodes A and B and terminals B+ and B−, which enables to apply the voltage present between nodes A and B between terminals B+ and B− in both directions. According to an embodiment, the inverter bridge comprises a switch $SW_3$ coupling node A to terminal B+, a switch $SW_4$ coupling node A to terminal B−, a switch $SW_5$ coupling node B to terminal B+, and a switch $SW_6$ coupling node B to terminal B−. As an example, each switch $SW_{Lk}$ and $SW_{2,k}$, with k varying from 1 to M, $SW_3$, $SW_4$, $SW_5$, and $SW_6$ may correspond to an insulated-gate field effect transistor, also called MOS transistor, particularly a MOS power transistor, for example, an N-channel MOS transistor.

Each module $E_i$ further comprises slave control circuit 12 (µC), capable of exchanging and of receiving data transmitted by master control circuit BMS over bus BUS0 and of exchanging data with master control circuit BMS over bus BUS1. Slave control circuit 12 may correspond to a dedicated circuit and/or may comprise a processor, for example, a microprocessor or a microcontroller, capable of executing instructions of a computer program stored in the memory.

Each module $E_i$ further comprises a driver circuit 14 (Inverter bridge driver) coupled to switches $SW_3$, $SW_4$, $SW_5$, and $SW_6$ of the inverter bridge and a driver circuit 16 (Transistors driver) coupled to switches $SW_{Lk}$ and $SW_{2,k}$, with k varying from 1 to M. Each driver circuit 14, 16 is capable of converting the control signals delivered by slave control circuit 12 into signals capable of controlling the switches.

Each module $E_i$ further comprises sensors 18 (U, I, T° sensor) coupled to slave control circuit 12. Module $E_i$ may comprise, for each cell $C_k$, a temperature sensor capable of measuring the temperature of cell $C_k$. Module $E_i$ may further comprise, for each cell $C_k$, a voltage sensor capable of measuring the voltage across cell $C_k$. Module $E_i$ may further comprise, for each cell $C_k$, a current sensor capable of measuring the current delivered by cell $C_k$. The slave control circuit 12 of each module $E_i$ is capable of transmitting third data to master control circuit BMS over slow bus BUS1 representative of the measurements performed by the sensors 18 of module $E_i$. The number and the type of sensors particularly depend on the arrangement of the cells of module $E_i$. In the cell arrangement shown in FIG. 3, a single sensor of the current flowing at node A or at node B may be provided.

In the embodiment illustrated in FIG. 3, an order of connection of a cell $C_k$ of a module $E_i$ means that cell $C_k$ should be series-connected between the nodes A and B of module $E_i$, which is obtained by turning on switch $SW_{1,k}$ and by turning off switch $SW_{2,k}$, and an order of disconnection of a cell $C_k$ of a module $E_i$ means that cell $C_k$ should not be series-connected between the nodes A and B of module $E_i$, which is obtained by turning off switch $SW_{1,k}$ and by turning on $SW_{2,k}$. However, for a different arrangement of the cells $C_k$ of module $E_i$ where cells $C_k$ may be arranged in series or in parallel between nodes A and B, an order of connection of cells $C_k$ should further specify in which configuration, series or parallel, cell $C_k$ is placed with respect to the other cells of module $E_i$.

Master control circuit BMS is capable of determining the cell priority table. According to an embodiment, the priority table is stored in memory MEM of master control circuit BMS in the form of a table, each row of the table for example corresponding to a row of memory MEM. For a battery comprising N cells, the priority table comprises N rows. The priority table may comprise a first column having identifiers of the battery cells stored therein. As an example, for a battery comprising N cells, the cell identifiers range from 1 to N. The priority table may comprise a second column having the priority levels of the cells stored therein. As an example, for a battery comprising N cells, the priority levels of the cells range from 1 to N, priority level "1" being the highest and priority level "N" being the lowest.

Master control circuit BMS updates the priority table when the priority levels of the cells are modified. As an example, the priority levels of the cells may be modified by master control circuit BMS particularly based on the data measured by the cell sensors.

Each slave control circuit 12 comprises a memory MEM' for the storage of the priority table or of a portion of the priority table. According to an embodiment, master control circuit BMS sends to each slave control circuit 12 the entire priority table, which is stored in memory MEM' of slave control circuit 12. According to another embodiment, control circuit BMS sends to each slave control circuit 12 the portion of the priority table relative to the cells controlled by slave control circuit 12. Each slave control circuit 12 then only keeps in memory MEM' the portion of the priority table concerning it. In the rest of the disclosure, when it is spoken of a priority table stored by a slave control circuit 12, this may mean the entire priority table or the portion of the priority table relative to the cells controlled by slave control circuit 12 according to the implemented control method. For each module $E_i$, the slave control circuit 12 of module $E_i$ determines, based on the number of cells requested by master control circuit BMS and on the priority levels of the cells forming it, the cells of module $E_i$ to be connected/disconnected to follow set point C. An advantage of such an embodiment is that the responsiveness of battery 10 on reception of a new set point C is optimal.

Figure 4:
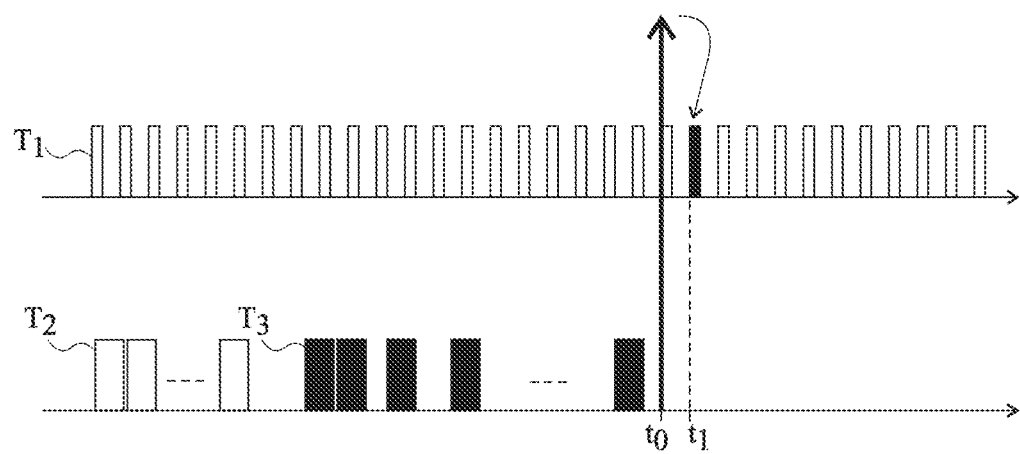
FIG. 4 is a timing diagram illustrating data exchanged between the master control circuit and the slave control circuits of the battery shown in FIG. 2 for an embodiment of a method of controlling the battery.

FIG. 4 is a timing diagram illustrating the data exchanged between master control circuit BMS and the slave control circuits 12 of the battery 10 shown in FIG. 2 for an embodiment of a method of controlling battery 10.

According to the present embodiment of the control method, the first data are transmitted by master control circuit BMS over fast bus BUS0. The first data may be representative of the total number of cells in series desired between terminals Phase and Neutral of battery 10 when modules $E_i$ have the configuration shown in FIG. 3. When the cells of each module can be placed in series and/or in parallel, the first data may be representative of the desired cell configuration. The first data may be transmitted over fast bus BUS0 in the form of frames $T_1$, for example regularly transmitted.

According to an embodiment of the data transmission method, each frame $T_1$ transmitted by master control circuit BMS is sent to all modules $E_i$, with i varying from 1 to N. The slave control circuit 12 of each module $E_i$ is thus used for each frame sent by master control circuit BMS over fast bus BUS0. The slave control circuit of each module $E_i$ is capable of analyzing frame $T_1$ to extract therefrom the desired cell configuration to follow set point C, for example, the number of cells to be series-connected.

According to the present embodiment of the control method, the second data transmitted by master control circuit BMS to slave control circuits 12 over slow bus BUS1 may be representative of the priority table or of a portion of the priority table when the latter is updated. In particular, an update of the priority table may be transmitted by master control circuit BMS to slave control circuits 12 for each modification of the priority table determined by master control circuit BMS. FIG. 4 shows frames $T_2$ transmitted by master control circuit BMS to slave control circuits 12 over slow bus BUS1 and comprising data representative of the last version of the data table. As an example, in the case where only the portion of the priority table relative to the cells contained by module $E_i$ is transmitted to each module $E_i$, the second data may be transmitted in the form of frames $T_2$, each frame $T_2$ comprising a header containing the address of the designated module $E_i$ followed by bytes relative to the portion of the priority table relative to module $E_i$, and possible followed by at least one control byte. The slave control circuit 12 of each module $E_i$ is then capable of determining whether the control signal that it receives is addressed thereto. According to another example, each frame is sent to all modules $E_i$. The slave control circuit 12 of each module $E_i$ is then used for each frame $T_2$ sent by master control circuit BMS over slow bus BUS1.

Master control circuit BMS associates a number with each version of the priority table. As an example, when master control circuit BMS updates the priority table, it modifies the version number associated with the new priority table. According to an embodiment, each frame $T_2$ comprising data relative to a priority table further comprises a version number of the priority table.

Each slave control circuit 12 is capable of regularly transmitting to master control circuit BMS the number of the most recent version in the priority table which is stored in memory MEM'. FIG. 4 represents with black frames $T_3$ the data transmitted by slave control circuits 12 to master control circuit BMS over slow bus BUS1 and comprising the numbers of the last versions of the priority tables stored by the slave control circuits.

In normal operation, in the absence of an update of the priority table, each slave control circuit 12 has stored in memory MEM' a priority table which is used to determine the cells to be connected/disconnected. When master control circuit BMS updates the priority table, it transmits the priority table updated with the new version number to slave control circuits 12. Each slave control circuit 12 stores the new priority table while keeping in memory the previous version of the priority table. For each module $E_i$, when the slave control circuit 12 of module $E_i$ has stored the new priority table, it transmits a frame $T_3$ to master control circuit BMS, containing the number of the new version of the priority table as well as the identifier of module $E_i$. However, slave control circuit 12 keeps on processing the first data received over fast bus BUS0 with the previous version of the priority table. Slave control circuit 12 then has in memory the previous version of the priority table and the new version of the priority table.

Master control circuit BMS determines which slave control circuit 12 has received the new version of the priority table based on the received frames $T_3$. At time $t_0$, master control circuit BMS has received an acknowledgement of receipt of the new version of the priority table of each slave control circuit 12. At time $t_1$, master control circuit BMS orders the slave control circuits 12 to now use the new version of the priority table. According to an embodiment where master control circuit BMS sends a frame $T_2$ to all slave control circuits 12, master control circuit BMS may set to "1" a specific bit of frame $T_2$, which indicates to each slave control circuit 12 that the new version of the priority table should be used.

Figure 5:
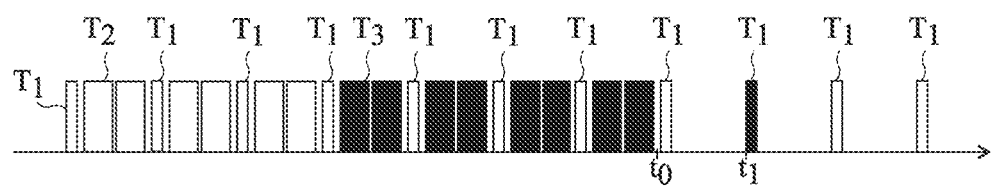
FIG. 5 is a timing diagram illustrating the data exchanged between the master control circuit and the slave control circuits of the battery shown in FIG. 1 for an embodiment of a method of controlling the battery.

FIG. 5 is a timing diagram illustrating the data exchanged between master control circuit BMS and the slave control circuits 12 of the battery 5 shown in FIG. 1 for an embodiment of a method of controlling battery 5.

In the present embodiment, the first data and the second data are transmitted over bus BUS. According to an embodiment, the frames $T_1$ relative to the first data are transmitted as a priority over the frames relative to the second data $T_2$ and over the frames $T_3$ relative to the versions of priority tables used by modules $E_i$. The rest of the method is identical to what has been previously described in relation with FIG. 4. In particular, at time $t_0$, master control circuit BMS has received an acknowledgement of receipt for the new version of the priority table of each slave control circuit 12 and, at time $t_1$, master control circuit BMS orders the slave control circuits 12 to now use the new version of the priority table.

Specific embodiments of the present invention have been described. Various alterations and modifications will occur to those skilled in the art. Although FIG. 3 shows an embodiment of arrangement of the cells and of the switches of a module $E_i$, it should be clear that the structure of each module $E_i$ may be different. In particular, the structure of each module $E_i$ may correspond to one of the structures described in patent application WO 2012/117110.

The invention claimed is:

1. A method of controlling an electric system comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells to one another and to the third and fourth terminals of the module and a second switch control circuit, the electric system further comprising at least one first data transmission bus coupling the first control circuit to each second control circuit, the method comprising the transmission, by the first control circuit to the second control circuits, of first data representative of an electric cell configuration to be obtained to follow a set point for the delivery of a voltage or of a current between the first and second terminals, the second control circuits connecting or disconnecting the electric cells based on said first data and on a classification of the priorities of the electric cells, wherein the method further comprises the steps of:

a) determination by the first control circuit of a new version of the priority classification;

b) transmission, by the first control circuit to each second control circuit, of second data representative of at least a portion of the new version of the priority classification;

c) transmission, by each second control circuit to the first control circuit, of third data indicating the reception by the second control circuit of said at least a portion of the new version of the priority classification; and d) transmission, by the first control circuit to the second control circuits, of an order to use the new version of the priority classification.

2. The control method according to claim 1, wherein the electric system further comprises a second data transmission bus coupling the first control circuit- to each second control circuit, wherein the first control circuit transmits the first data to the second control circuits over the first bus and transmits the second data to the second control circuits over the second bus.

3. The control method according to claim 2, wherein the second control circuits transmit the third data to the first control circuit over the second bus.

4. The control method according to claim 2, wherein the first control circuit transmits the order to use the new version of the priority classification to the second control circuits over the first bus.

5. The control method according to claim 2, wherein the first control circuit transmits the first data to the second control circuits over the first bus at a first rate and transmits the second data to the second control circuits over the second bus at a second rate smaller than the first rate.

6. The control method according to claim 1, wherein the first data are representative of the number of cells to be series-connected to follow the set point.

7. The control method according to claim 1, wherein the second data are representative of the entire priority classification.

8. The control method according to claim 1, wherein the second data are representative of the portion of the classification of the priorities of the electric cells of one of the modules.

9. The method of claim 1, wherein the first data are representative of an electric cell configuration to be obtained to follow a set point for the delivery of a voltage and of a current between the first and second terminals.

10. An electric system comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells to one another and to the third and fourth terminals of the module and a second switch control circuit, the electric system further comprising a first data transmission bus coupling the first control circuit to each second control circuit and a second data transmission bus coupling the first control circuit to each second control circuit, wherein the first control circuit is configured to transmit, to the second control circuits, first data representative of an electric cell configuration to be obtained to follow a set point for the delivery of a voltage and/or or of a current between the first and second terminals, the second control circuits being configured to connect or disconnect the electric cells based on said first data and on an electric cell priority classification, wherein the first control circuit is configured to determine a new version of the priority classification and to transmit to each second control circuit second data representative of at least a portion of the new version of the priority classification, wherein each second control circuit is configured to transmit to the first control circuit third data indicating the reception by the second control circuit of said at least a portion of the new version of the priority classification, and wherein the first control circuit is configured to transmit to the second control circuits an order to use the new version of the priority classification.

11. The electric system of claim 10, wherein the first data are representative of an electric cell configuration to be obtained to follow a set point for the delivery of a voltage and of a current between the first and second terminals.

\* \* \* \* \*